United States Patent
Choi et al.

(10) Patent No.: US 9,624,645 B2
(45) Date of Patent: Apr. 18, 2017

(54) DOUBLE-STRUCTURE BUSH AND BEARING ASSEMBLY COMPRISING SAME

(71) Applicant: Doosan Infracore Co., Ltd., Incheon (KR)

(72) Inventors: Ji Won Choi, Gyeonggi-do (KR); Dong Pil Lim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/769,287

(22) PCT Filed: Oct. 18, 2013

(86) PCT No.: PCT/KR2013/009322
§ 371 (c)(1),
(2) Date: Aug. 20, 2015

(87) PCT Pub. No.: WO2014/129718
PCT Pub. Date: Aug. 28, 2014

(65) Prior Publication Data
US 2015/0376864 A1    Dec. 31, 2015

(30) Foreign Application Priority Data
Feb. 21, 2013  (KR) .................. 10-2013-0018549

(51) Int. Cl.
*F16C 33/20*  (2006.01)
*F16C 17/02*  (2006.01)
(Continued)

(52) U.S. Cl.
CPC ............ *E02F 9/006* (2013.01); *E02F 9/2275* (2013.01); *F16C 17/02* (2013.01); *F16C 33/20* (2013.01); *F16C 33/205* (2013.01)

(58) Field of Classification Search
CPC ......... E02F 9/006; E02F 9/2275; F16C 33/20; F16C 33/201; F16C 33/203; F16C 33/205;
(Continued)

(56) References Cited

U.S. PATENT DOCUMENTS 3,238,601 A * 3/1966 White .................... B05D 5/083
29/898.058
3,507,527 A * 4/1970 White ................ F16C 11/0633
384/203
(Continued)

FOREIGN PATENT DOCUMENTS

JP  2004-316804  11/2004
JP  2006-038180  2/2006
(Continued)

OTHER PUBLICATIONS

International Search Report for International Patent Application PCT/KR2013/009322 mailed Jan. 10, 2014. 5 pages.
(Continued)

*Primary Examiner* — Alan B Waits
(74) *Attorney, Agent, or Firm* — K&L Gates LLP

(57) ABSTRACT

The present disclosure relates to a double-structure bush usable in a joint portion which operates in low speed and high load, and to a bearing assembly comprising same.

6 Claims, 3 Drawing Sheets

(51) Int. Cl.
*E02F 9/00* (2006.01)
*E02F 9/22* (2006.01)

(58) Field of Classification Search
CPC .............. F16C 2208/02; F16C 2208/04; F16C 2208/82; F16C 17/02; F16C 2202/22
See application file for complete search history.

(56) References Cited

U.S. PATENT DOCUMENTS

| | | | | |
|---|---|---|---|---|
| 3,582,166 | A * | 6/1971 | Reising | F16C 23/045 384/213 |
| 4,006,051 | A * | 2/1977 | Board, Jr. | F16C 33/201 156/247 |
| 4,084,863 | A * | 4/1978 | Capelli | F16C 11/06 384/202 |
| 4,111,499 | A * | 9/1978 | McCloskey | F16C 23/045 384/192 |
| 4,263,361 | A * | 4/1981 | Hodes | B32B 15/14 384/297 |
| 4,867,889 | A * | 9/1989 | Jacobson | C10M 169/04 508/106 |
| 6,139,261 | A * | 10/2000 | Bishop | F16C 3/00 384/281 |
| 6,170,990 | B1 * | 1/2001 | Hawkins | F16C 33/16 384/276 |
| 7,226,213 | B2 * | 6/2007 | Roos | F16C 33/04 384/298 |
| 8,979,376 | B2 * | 3/2015 | Angenheister | F16C 11/0633 384/203 |
| 9,157,478 | B2 * | 10/2015 | Joachimsmeyer | F16C 17/26 |
| 9,297,416 | B2 * | 3/2016 | Ziegler | C22C 9/02 |
| 2007/0065067 | A1 | 3/2007 | Gartner et al. | |
| 2015/0184694 | A1 * | 7/2015 | Mekhilef | C09D 179/08 428/458 |
| 2015/0219156 | A1 * | 8/2015 | Okubo | F16C 33/208 442/237 |

FOREIGN PATENT DOCUMENTS

| | | |
|---|---|---|
| JP | 2007-192317 | 8/2007 |
| JP | 2007198606 | 9/2007 |
| KR | 2007-198606 | 8/2007 |
| KR | 1020100114648 | 10/2010 |

OTHER PUBLICATIONS

Extended Search Report issued for related European Patent Application No. 13876005.3 on Sep. 16, 2016. 6 pages.

* cited by examiner

DOUBLE-STRUCTURE BUSH AND BEARING ASSEMBLY COMPRISING SAME

CROSS REFERENCE TO RELATED APPLICATIONS

The present application is a National Stage of International Application No. PCT/KR2013/009322, filed on Oct. 18, 2013, which claims priority to Korean Patent Application No. 10-2013-0018549, filed on Feb. 21, 2013, the entire contents of each of which are being incorporated herein by reference.

FIELD OF THE DISCLOSURE

The present disclosure relates to a double-structure bush usable in a joint portion which operates in low speed and high load, and a bearing assembly comprising the same.

BACKGROUND OF THE DISCLOSURE

Construction machines such as an excavator and a skid steer loader includes a plurality of joint portion, for example, the connecting portions between a boom and an arm and between an arm and a bucket. The joint portion of the construction machines generally oscillate with a pin and a bush lubricated with grease.

FIG. 1 illustrates a front joint portion 10 of an excavator, as an example of construction machines. FIG. 2 is a cross-sectional view of a bush of the joint portion 10 of the excavator, taken perpendicular to the longitudinal direction of a pin. The joint portion 10, as illustrated in FIG. 2, is composed of a pin 12 connecting two members requiring a joint motion and a bush 11 reducing friction resistance between the pin and a pin hole. The pin 12 and the bush 11 are generally oscillated at lubrication environment with grease. The joint portion 10 includes, other than the pin 12 and the bush 11, a boss 13 of a housing supporting the pin and the bush, and a sealing (not illustrated) for blocking dirt.

The joint portion operates under various conditions in accordance with the connection type between the pin and the bush, the operational environment, and the type of the joint portion. They generally operate at surface pressure of about 2 to 6 kg/mm² and a speed of about 0.25 to 5 cm/sec. Such an operation condition is a typical average and the surface pressure of the operation condition may rapidly increase, depending on the work load, and instantaneous surface pressure may be three times of more of an average value due to eccentric load in working, depending on the operation condition.

The bush used in high surface pressure and a low speed requires high resistance against scuffing and wear resistance. So, products of the bush with various composite and types have been developed and used.

For example, those are a metal bush of which the lubrication ability is maximized by forming grooves or dimples on the inner circumferential surface of a metallic rigid body and putting grease in the grooves or the dimples; a metal bush of which the lubrication ability is maximized by coating the surface with a self-lubricative material; a porous-sintered metal bush including a lubricant, and the like.

However, in the front sections of construction machines, the direction and level of load applied to each parts are very changeable and frequently changed in accordance with the configuration of the ground, the position of the machines, the geological features, and the like, so the parts are bent or eccentric load is applied to the machines, and accordingly, high load concentrates on local regions. Thus, all the parts including a bush require high-level wear resistance and impact resistance.

However, metal bushes that have been known up to now have a limited elastic strain regardless of the shape, so high load to local regions cannot be avoid under the condition that the direction and level of load is changeable, as described above. Further, even if the surface of metal bushes are coated with a self-lubricative material, the lifespan of the self-lubricative material is limited, so it is difficult to keep the lubrication environment after the bush surfaces are initially stabilized. On the other hand, when a porous metal-sintered body is continuously exposed to impact, pores in the sintered body gradually decrease from the surface where load is applied. Further, if severe, the pores in the sintered body are closed, so the effect of keeping lubrication by the lubricant in the sintered body may not be maintained.

SUMMARY

An embodiment of the present disclosure is to provide a bush that can exhibit excellent elasticity, returning ability, lubrication characteristic, and load resistance in a joint portion operating in high load and low speed.

Another embodiment of the present disclosure is to provide a bearing assembly comprising the bush.

The present disclosure provides a double-structure bush made of a polymeric composite that comprises: a slide layer configured to receive a pin unit, in which the inner circumferential surface of the slide layer is in contact with the pin unit to support rotation of the pin unit; and a load support layer integrally stacked on the outer circumferential surface of the slide layer, configured to be received in a boss, in which the load support layer is in contact with the inner circumferential surface of the boss to support radial load of the pin unit, in which the ratio $T_2/T_1$ of the thermal expansion coefficient $T_2$ of the load support layer to the thermal expansion coefficient $T_1$ of the boss in a temperature range of −40 to 50° C. is 1.5 to 3.1, and the ratio $T_4/T_3$ of the thermal expansion coefficient $T_4$ of the slide layer to the thermal expansion coefficient $T_3$ of the load support layer in a temperature range of 50 to 130° C. is 3.5 to 5.

Preferably, the ratio $T_2/T_1$ of the thermal expansion coefficient $T_2$ of the load support layer to the thermal expansion coefficient $T_1$ of the boss in a temperature range of −40 to 50° C. may be 1.8 to 2.2, and the ratio $T_4/T_3$ of the thermal expansion coefficient $T_4$ of the slide layer to the thermal expansion coefficient $T_3$ of the load support layer in a temperature range of 50 to 130° C. may be 4.0 to 4.6.

Further, the present disclosure provides a bearing assembly including the double-structure bush made of a polymeric composite.

The present disclosure provides a bush made of a polymeric composite, which can exhibit excellent elasticity and restoring ability under a low-speed high-load operation condition, unlike metallic bushes of prior art, so load can be uniformly distributed through deformation when load is applied at local regions. Accordingly, abnormal wear due to stress concentration and breakage due to impact can be prevented, so wear resistance and impact resistance can be improved and the lifespan can also be improved.

Further, according to the present disclosure, the load support layer being in contact with the inner circumferential surface of a boss and supporting radial load of a pin unit is integrally stacked on the outer circumferential surface of the slide layer receiving the pin unit in contact with the pin unit on the inner circumferential surface, and a ratio of the thermal expansion coefficient of the load support layer in a low-temperature range relative to the boss and a ratio of the thermal expansion coefficient of the slide layer in a high-temperature range relative to the load support layer are adjusted within a predetermined range, respectively. Accordingly, idling between the boss and the bush is prevented in an extremely cold region. Further, even if the temperature of the inner circumferential surface of the slide layer increases, interface separation between the slide layer and the load support layer is prevented, and excellent lubrication characteristic can be kept even without periodic greasing.

DESCRIPTION OF MAIN REFERENCE NUMERALS OF DRAWINGS

Figure 1:
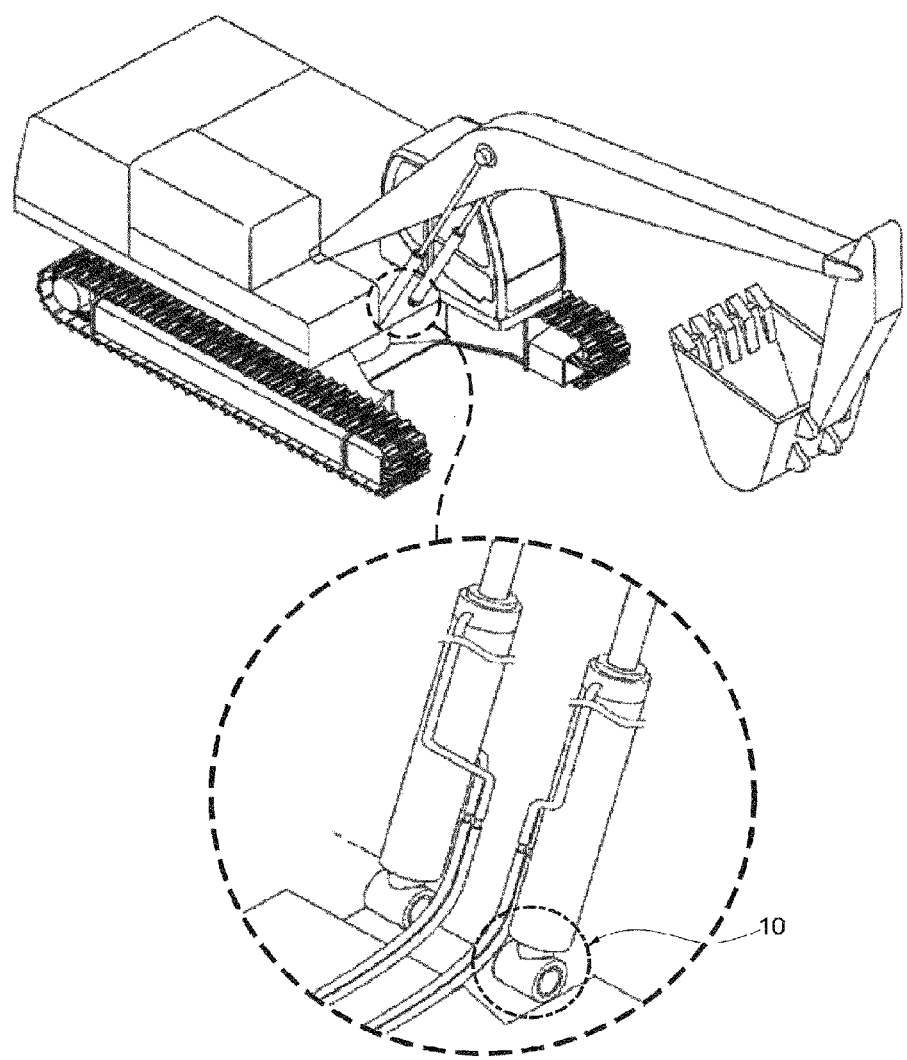
FIG. 1 is a view illustrating an example of a general excavator and a joint portion where a bush can be installed in the excavator.
Figure 2:
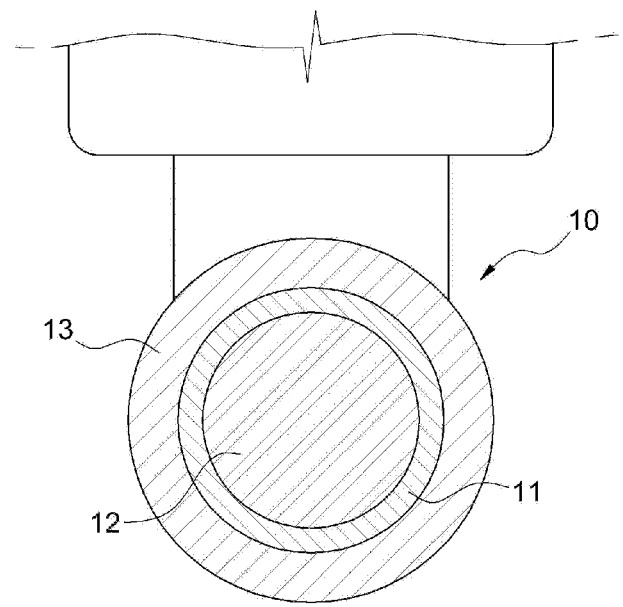
FIG. 2 is a cross-sectional view of a bush of the related art installed at the joint portion illustrated in FIG. 1, perpendicular to the longitudinal direction of a pin.

| 10: Joint Portion | 11: Bush of prior |
| 12, 200: Pin | 13, 300: Boss |
| 100: Bush of the present disclosure | 101: Slide layer |
| 102: Load support layer | |

DETAILED DESCRIPTION

The present will be described hereafter.

The present disclosure provides a bush made of a polymeric composite, which is characterized in that it has a double structure, which includes a slide layer receiving a pin unit, in which the inner circumferential surface of the slide layer is in contact with the pin unit to support rotation of the pin unit and a load support layer integrally stacking to cover the outer circumferential surface of the slide layer, received in a boss, in which the load support layer is in contact with the inner circumferential surface of the boss to support radial load of the pin unit, and a ratio of the thermal expansion coefficient of the load support layer in a low-temperature range relative to the boss and a ratio of the thermal expansion coefficient of the slide layer in a high-temperature range relative to the load support layer are adjusted within a predetermined range, respectively.

The inventors have known that when a bush is made of a polymeric composite comprising a polymeric matrix, a fiber base, and a self-lubricative material, the polymeric composite can keep high elasticity and can be restored under an operation condition of a low speed and high load, unlike metal bushes or porous sintered bushes of prior art. Further, a bush made of a polymeric composite can keep a low friction coefficient by a self-lubricative material, so it is possible to keep an excellent lubrication environment even without periodic greasing, unlike bushes of prior art.

However, polymeric composites are easily deformed with a temperature change, unlike metal. Accordingly, when the temperature dependency of polymeric composites is not considered, it is difficult to use a bush made of a polymeric composite under various operation conditions of construction machines.

According to the present disclosure, a double structure is formed by integrally stacking a layer (hereafter, 'load support layer') made of a polymeric composite including a polymeric matrix and a fiber base on the outer circumferential surface of a layer (hereafter, 'slide layer) made of a polymeric composite including a polymeric matrix, a fiber base, and a self-lubricative material, in which a ratio of the thermal expansion coefficient of the load support layer in a low-temperature range relative to the boss and a ratio of the thermal expansion coefficient of the slide layer in a high-temperature range relative to the load support layer are set within a predetermined range, respectively, by adjusting the contents of the components in the polymeric composite of each layer. Accordingly, the double-structure bush according to the present disclosure is improved in wear resistance, impact resistance, and load resistance while keeping excellent lubrication characteristic, so the lifespan can be improved. Further, according to the double-structure bush of the present disclosure, there is no flow between the inner circumferential surface of the boss and the outer circumferential surface of the load support layer and interface bonding force between the load support layer and the slide layer of the bush is large, even under various use conditions after the bush is press-fitted on the boss of a housing, so interface between the load support layer and the slide layer is less generated, and accordingly, the lifespan of the bush can be improved.

In detail, since the double-structure bush according to the present disclosure includes the load support layer integrally formed on the slide layer, it has excellent load resistance under an operation condition of high load and can keep a lubrication characteristic even without periodic greasing.

However, similar to metal bushes, the double-structure bush made of a polymeric composite according to the present disclosure is also machined with a tolerance larger than the inner diameter of a boss of a housing and then press-fitted on the boss of the housing. Therefore, according to the double-structure bush of the present disclosure, the degrees of an increase and a decrease in volume due to a change in external temperature should be similar to the degrees of an increase and a decrease in volume of the housing and the outer circumferential surface of the bush, that is, the outer circumferential surface of the load support layer should not idle on the inner circumferential surface of a boss by torque generated in operation and external force. However, housings are usually made of cast steel and the thermal expansion coefficient of cast steel has been known as two-time smaller than the thermal expansion coefficient of polymeric materials known in the art. Accordingly, when a low-temperature condition of about −40° C. is applied after a bush made of a polymeric material is forcibly fitted on a boss of a housing made of cast steel, the outer circumferential surface of the bush may idle on the inner circumferential surface of the boss of the housing, because the contraction amount of the volume of the bush is larger than the contraction amount of the volume of the housing.

Accordingly, in the present disclosure, the thermal expansion coefficient of the load support layer is precisely set within an equipment operation temperature range (a low-temperature range of −40 to 50° C.) for a severely cold region by adjusting the contents of the components in a polymeric composite forming the load support layer when the load support layer is formed, so the ratio $T_2/T_1$ between the thermal expansion coefficient $T_1$ of the boss and the thermal expansion coefficient $T_2$ of the load support layer in the temperature range of −40 to 50° C. is adjusted to about 1.5 to 3.1, preferably 1.8 to 2.2. If the ratio $T_2/T_1$ of thermal expansion coefficients between the boss and the load support layer in the range of −40 to 50° C. is over 3.1, limit surface pressure maintaining press-fitting force under a low-temperature condition becomes close to the level of operation surface pressure, so the load support layer of the bush may idle, not fixed to the inner circumferential surface of the boss in operation, depending on the use conditions. Meanwhile, when the ratio $T_2/T_1$ of thermal expansion coefficients between the boss and the load support layer in the temperature range of −40 to 50° C. is less than 1.5, the strength of the load support layer decreases and the lifespan of the bush may be reduced.

Further, the slide layer of the double-structure bush according to the present disclosure operates continuously in contact with a pin. The temperature on the inner circumferential surface of the slide layer is increased by the relative motion to the pin, so large temperature gradient is generated between the inner circumferential surface and the outer circumferential surface of the slide layer. Accordingly, the temperature difference between the inner circumferential surface and the outer circumferential surface of the slide layer may be about 50° C. or more, depending on the temperature of external air and the operation conditions, so when the difference of thermal expansion coefficients between the slide layer and the load support layer is not set at a predetermined level or less, interface separation may occur between the slide layer and the load support layer, and accordingly the slide layer or the load support layer may be worn or broken and the lifespan of the bush may decrease.

Therefore, according to the present disclosure, when the load support layer is manufactured, as described above, the thermal expansion coefficient of the load support layer is adjusted and the thermal expansion coefficient of the slide layer is adjusted by adjusting the contents of the components in the polymeric composite forming the slide layer within a predetermined range. Accordingly, the ratio $T_2/T_1$ of thermal expansion coefficients between the boss and the load support layer in the temperature range of −40 to 50° C. and the ratio $T_4/T_3$ of the thermal expansion coefficient $T_4$ of the slide layer to the thermal expansion coefficient $T_3$ of the load support layer in a temperature range of 50 to 130° C. is adjusted to about 3.5 to 5, preferably about 3.5 to 4.6, and more preferably about 4.0 to 4.6. If the ratio $T_4/T_3$ of the thermal expansion coefficients between the load support layer and the slide layer in the temperature range of 50 to 130° C. exceed than 5, interface separation may be generated between the slide layer and the load support layer and the lifespan of the bush may be decreased. Meanwhile, if the ratio $T_4/T_3$ of the thermal expansion coefficients between the load support layer and the slide layer in the temperature range of 50 to 130° C. is less than 3.5, the strength of the load support layer may be decreased and the lifespan of the bush may be reduced.

Figure 3:
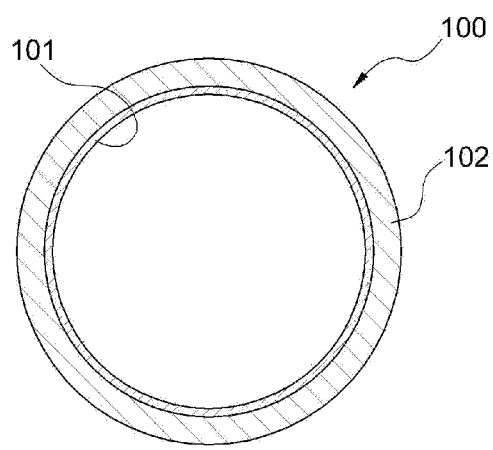
FIG. 3 is a cross-sectional view of a bush according to the present disclosure.
Figure 4:
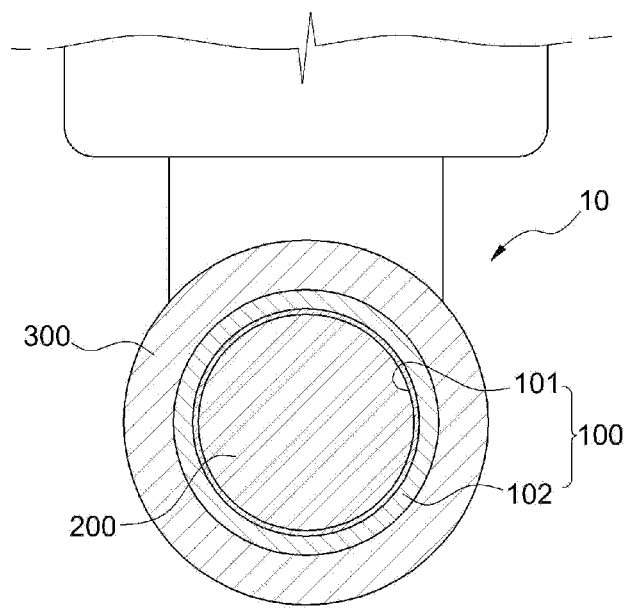
FIG. 4 is a cross-sectional view of a double-structure bush according to the present disclosure installed at the joint portion illustrated in FIG. 1, perpendicular to the longitudinal direction of a pin.
Figure 5:
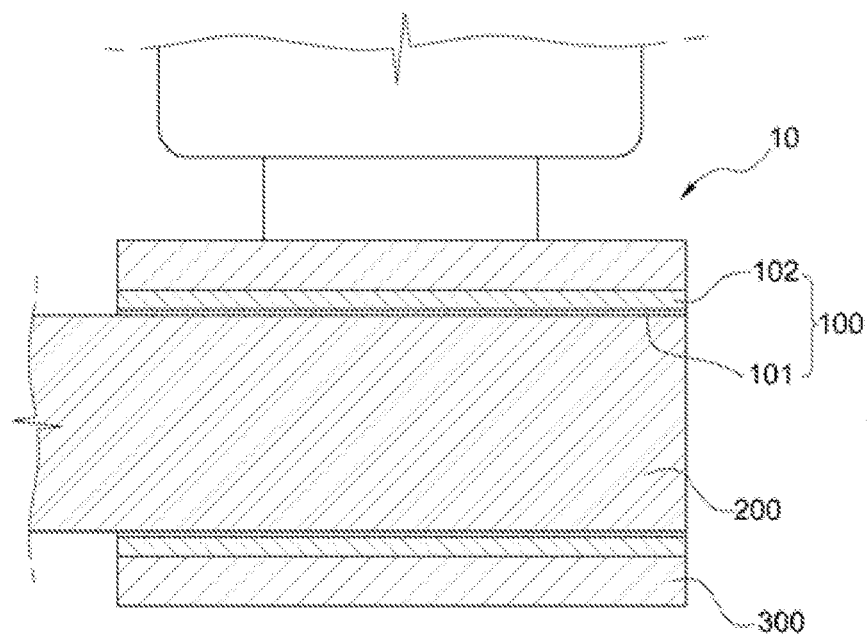
FIG. 5 is a cross-sectional view of the double-structure bush according to the present disclosure installed at the joint portion illustrated in FIG. 1, in the longitudinal direction of a pin.

A bush 100 according to the present disclosure is made of a polymeric composite, and when it is installed in a front joint portion of a construction machine, it supports load and makes oscillation. The bush 100 has a space that can accommodate a pin unit 200 and makes motions relative to the pin unit, and as illustrated in FIGS. 3 to 5, it includes a slide layer 101 and a load support layer 102.

The slide layer 101 receives the pin unit 200, in which the inner circumferential surface of the slide layer is in contact with the pin unit to support rotation of the pin unit. The slide layer 101 is made of a first polymeric composite comprising a first polymeric matrix, a self-lubricative material, and a first fiber base. When the mixing ratio of the first polymeric matrix, self-lubricative material, and first fiber base is adjusted to 20 to 22:20 to 55:25 to 30 by weight, preferably, 20 to 21.5:20 to 53:26 to 30 by weight, the ratio $T_4/T_3$ of the thermal expansion coefficient $T_4$ of the slide layer to the thermal expansion coefficient $T_3$ of the load support layer in the temperature range of 50 to 130° C. is controlled to about 3.5 to 5, preferably about 4 to 4.6. The slide layer has excellent elasticity and restoration ability and can maintain an excellent lubrication characteristic even without periodic greasing, so it can maintain a low friction characteristic, and accordingly, the pin unit 200 being in contact with the inner circumferential surface can smoothly rotate. Further, the difference between the thermal expansion coefficients of the slide layer and the load support layer is small and interface separation from the load support layer is less generated, even if a temperature of the inner circumferential surface of the slide layer increases, so the slide layer is less worn or broken, and accordingly, the lifespan of the bush can be improved.

The first polymeric matrix is not specifically limited and may be an epoxy-based polymer, a polyurethane-based polymer, a polyamide-based polymer, a polyalphaolefin-based polymer, a vinyl-based polymer, an acryl-based polymer, a polyacetal-based polymer, a polyether-based polymer, a polyester-based polymer, polyethersulfone-based polymer, a polysulphide-based polymer, a polyimide-based polymer, a polypeptide-based polymer, a polyketone-based polymer, a polyolefin-based polymer, a vinylidene-based polymer, and copolymers of them. These polymers may be used separately or in mixtures of two or more. When a bush is manufactured by use of the epoxy-based polymer, curing occurs rapidly, so productivity can be improved. The thermal and chemical stability of the bush can also be improved. However, when a polymer compatible with a second polymeric matrix described below is used at the first polymeric matrix, the polymeric matrixes of a slide layer and a load support layer are diffused or covalently bonded on the interface of the layers, so the load support layer can be more easily integrally stacked on the slide layer even without a use of an adhesive. Further, when compatible polymeric matrixes are used, the hardening conditions are similar, so there is no need for specifically hardening each layer, and accordingly, the work speed can be improved.

Further, the first polymeric composite includes a self-lubricative material (self-lubricative particle). The self-lubricative material, which is a solid particle having low friction resistance even without a lubricant, continuously gives a low friction resistance to a bush, and can prevent the inner circumferential surface of the slide layer from being wear, or burned and bonded when making a motion relative to a pin.

The self-lubricative material is not limited and, for example, may be Graphite, Graphite fluoride, $MoS_2$, $MoSe_2$, $WS_2$, $WSe_2$, $NbS_2$, $NbSe_2$, $TaS$, $TaSe_2$, $TiS_2$, $TiSe_2$, $TiTe_2$, $CeF_3$, $Ba(OH)_2$, $CdCl_2$, $CoCl_2$, $ZrCl_2$, $PbCl_2$, $PbI_2$, $BN$, $Ag_2SO_4$, Borax($Na_2B_4O_7$), Talc[$Mg_3(OH)_2Si_2O_{10}$], Mica [$KAl_2(Si_3Al)O_{10}(OH)_2$], $ZnS$, $SnS_2$, $FeS$, $CaF_2$, $LiF$, $Zn_2P_2O_7$, $Ca_3(PO_4)_2$, $Fe_2P_2O_7$, $Ca(OH)_2$, $Mg(OH)_2$, $Zn(OH)_2$, PbO, ZnO, FeO, $Fe_2O_3$, $Fe_3O_4$, polytetrafluoroethylene(PTFE), Fluorinated ethylene propylene(FEP), Pb, Sn, Zn, Cu, Ag, and In. In these components, Graphite, PTFE, or a mixture of them is preferable, and PTFE is more preferable.

As the self-lubricative material, a mixture of a self-lubricative material of a resin type such as PTFE and a self-lubricative material of a non-resin type such as graphite may be used. In this case, when the mixing ratio of the self-lubricative material of a resin type and the self-lubricative material of a non-resin type is 10 to 90:90 to 10 by weight, preferably, 20 to 70:30 to 80 by weight, not only the lubrication characteristic, but the wear resistance and load resistance of the bush can be further improved.

Further, the first polymeric composite includes the first fiber base. As the first fiber base is included, the strength of the slide layer can be improved.

The first fiber base may be yarn, woven fabric, knitting, and braid, and when woven fabric is used, it is possible to easily adjust the thickness of the slide layer when manufacturing a bush, using filament winding, so workability can be improved. Further, when the slide layer is formed by winding woven fabric around a mandrel, shear deformation does not easily occur, unlike knitting or braid and the slide layer can be formed with uniform thickness and shape, so the entire slide layer can have uniform strength.

The material (fiber) of the first fiber base is not specifically limited and for example there are a vegetable fiber such as cotton or linen; an animal fiber such as wool or silk; a regenerative fiber such as rayon; a synthetic fiber such as polyester, acryl, nylon, and polyurethane; an inorganic fiber such as a glass fiber and a carbon fiber; a metal fiber; and the like, and these materials may be separately used or mixture of two or more of them may be used. In these fibers, when an inorganic fiber such as a glass fiber and a carbon fiber is used, a moisture content is low, so pores are not formed in a bush after hardening and thermal stability is also excellent. Accordingly, when fabric made of an inorganic fiber is used, strength and thermal stability of a resultant bush can be improved.

Other than the components described above, the first polymeric composite may further include an additive such as an initiator and a diluent within a range that does not deteriorate the lubrication characteristic of the slide layer in order to further improve the properties of the slide layer, if necessary.

The initiator is appropriately selected in accordance with the type of the first polymeric matrix and, for example, there are a Benzo phenone-based initiator, a thioxantone-based initiator, an a-hydroxyketone-based initiator, an a-amino ketone-based initiator, a benzyl dimethyl ketal (BDK)-based initiator, a phenyl glyoxylate-based initiator, an acyl phosphine oxide-based initiator, and the like, but it is not limited thereto.

As the diluent, there are Butyl Glycidyl Ether(BGE), Phenyl Glycidyl Ether(PGE), Aliphatic Glycidyl Ether(C12-C14), Modifide-Tert-Carboxylic Dlycidyl Ester, DiButyl-Phthalate(DBP), DiOctylPhthalate(DOP), Nonyl-Phenol, Hysol, and the like, but it is not limited thereto.

Further, additives such as an antifoaming agent, a viscosity control agent, a wetting agent, and a luster control agent may be included in micro-amount to improve properties in hardening and adjust bubbles and the degree of luster.

The contents of the initiator, diluent, and other additives are not specifically limited and may be about 1 to 10 parts by weight in a first polymeric matrix of 100 parts by weight.

The bush 100 according to the present disclosure, as illustrated in FIGS. 3 to 5, includes the load support layer 102 integrally stacked on the slide layer 101 to cover the outer circumferential surface of the slide layer 101. The load support layer 102 may be disposed inside a boss 300 in contact with the inner circumferential surface of the boss 300 and can support radial load on the pin unit 200.

The load support layer 102 is made of the second polymeric composite including a second polymeric matrix and a second fiber base. In this case, when the mixing ratio of the second polymeric matrix and the second fiber base is adjusted to 18 to 21:79 to 82 by weight, preferably 19 to 20:80 to 81 by weight, the ratio $T_2/T_1$ of the thermal expansion coefficient $T_2$ of the load support layer to the thermal expansion coefficient $T_1$ of the boss in the temperature range of −40 to 50° C. is controlled to about 1.5 to 3.1, preferably, about 1.8 to 2.2, and the ratio $T_4/T_3$ of the thermal expansion coefficient $T_4$ of the slide layer to the thermal expansion ratio $T_3$ of the load support layer in the temperature range of 50 to 130° C. is controlled to about 3.5 to 5, preferably about 4 to 4.6. The load support layer does not idle on the inner circumferential surface of the boss without a decrease in strength in operation even in an extremely cold region, and even if a temperature of the inner circumferential surface of the slide layer increases, interface separation from the slide layer is not generated, so wear and breakage due to interface separation from the slide layer can be reduced. Further, the load support layer can supplement the load resistance of the slide layer and improve wear resistance and impact resistance even if eccentric load is generated by the pin unit when it is in contact with the inner circumferential surface of the boss, because elasticity and restoration ability are excellent, and the lifespan can be improved.

The second polymeric matrix is not specifically limited and may be an epoxy-based polymer, a polyurethane-based polymer, a polyamide-based polymer, a polyalphaolefin-based polymer, a vinyl-based polymer, an acryl-based polymer, a polyacetal-based polymer, a polyether-based polymer, a polyester-based polymer, polyethersulfone-based polymer, a polysulphide-based polymer, a polyimide-based polymer, a polypeptide-based polymer, a polyketone-based polymer, a polyolefin-based polymer, a vinylidene-based polymer, copolymers of them, and the like. These polymers may be separately used or in the mixtures of two or more. When a bush is manufactured by use of the epoxy-based polymer curing occurs rapidly. So, productivity can be improved and the thermal and chemical stability of the bush can be improved. However, as described above, when a polymer compatible with the first polymeric matrix is used as the second polymeric matrix, the second polymeric matrix in the load support layer may be diffused into the surface of the slide layer and covalently bonded with the first polymeric matrix of the slide layer, at the interface between the slide layer and the load support layer, so the load support layer can be easily integrally stacked on the slide layer.

Further, the second polymeric composite includes the second fiber base. The second fiber base supplements the load resistance of the slide layer by improving strength of the load support layer.

Similar to the first fiber base, the second fiber base may be yarn, woven fabric, knitting, braid, and the like. When woven fabric in these materials is used, it is possible easily adjust the thickness of the load support layer when manufacturing a bush using filament winding, so workability is improved. Further, when woven fabric is wound around a mandrel or a slide layer, shear deformation does not easily occur, unlike knitting and braid, so the same thickness and shape are achieved, and accordingly, the entire load support layer can have uniform strength.

The material (fiber) of the second fiber base is not specifically limited and for example there are a vegetable fiber such as cotton or linen; an animal fiber such as wool or silk; a regenerative fiber such as rayon; a synthetic fiber such as polyester, acryl, nylon, and polyurethane; an inorganic fiber such as a glass fiber and a carbon fiber; a metal fiber; and the like, and these materials may be separately used or mixture of two or more of them may be used. In these fibers, when an inorganic fiber such as a glass fiber and a carbon fiber is used, a moisture content is low, so pores are not formed in a bush after hardening and thermal stability is also excellent. Accordingly, when fabric made of an inorganic fiber is used, strength and thermal stability of a resultant bush can be improved.

Other than the components described above, the second polymeric composite may further include an additive such as an initiator, an dispersing agent, and an antifoaming agent within a range that does not deteriorate the characteristics such as load resistance of the load support layer in order to further improve the properties of the load support layer, if necessary.

The initiator is appropriately selected in accordance with the type of the second polymeric matrix and, for example, there are a Benzo phenone-based initiator, a thioxantone-based initiator, an a-hydroxyketone-based initiator, an a-amino ketone-based initiator, a benzyl dimethyl ketal (BDK)-based initiator, a phenyl glyoxylate-based initiator, an acyl phosphine oxide-based initiator, and the like, but it is not limited thereto.

The content of the initiator is not specifically limited and may be about 1 to 10 parts by weight in a second polymeric matrix of 100 parts by weight.

As described above, in the double-structure bush made of a polymeric composite according to the present disclosure, the seizure cycle is 250,000 cycles or more and a press-fitting maintain limit surface pressure at −40° C. is 61 to 95 MPa, so the bush can be used under surface pressure of 2 to 6 kgf/mm² and a sliding speed of 0.25 to 3.5 cm/sec.

The double-structure bush according to the present disclosure can be manufactured in various ways.

According to an embodiment of the present disclosure, the double-structure bush can be manufactured by a method that includes: a step of forming a first polymeric composite including a first polymeric matrix, a self-lubricative material, and a first fiber base; a step of forming a second polymeric composite including a second polymeric matrix and a second fiber base; a step of winding the first polymeric composite around a mandrel to form a slide layer having a desired thickness; a step of winding the second polymeric composite on the first polymeric composite such that a load support layer having a desired thickness is formed; and a step of hardening the wound first polymeric composite and second polymeric composite, in which the use ratio the first polymeric matrix, the self-lubricative material, and the first fiber base of the first polymeric composite and the use ratio of the second polymeric matrix and the second fiber base of the second polymeric composite are adjusted within predetermined ranges, respectively such that the ratio of thermal expansion coefficient of the load support layer to the boss in the temperature range of −40 to 50° C. is about 1.5 to 3.1, the ratio of thermal expansion coefficient of the slide layer to the load support layer in the temperature range of 50 to 130° C. is 3.5 to 5.

The method may further include a step of cutting in the shape of a resultant bush after the step of hardening. Further, the method may further include a step of machining the inner circumferential surface of the slide layer and/or the outer circumferential surface of the load support layer of the resultant bush after the step of hardening.

According to another embodiment of the present disclosure, the double-structure bush can be manufactured by a method that includes: a step of forming a first polymeric composite including a first polymeric matrix, a self-lubricative material, and a first fiber base; a step of forming a second polymeric composite including a second polymeric matrix and a second fiber base; a step of winding the first polymeric composite around a mandrel to form a slide layer having a desired thickness; a step of forming a sliding layer by hardening the first polymeric composite wound on the mandrel; a step of winding the second polymeric composite on the slide layer such that a load support layer having a desired thickness is formed; and a step of forming the load support layer by hardening the wound second polymeric composite, in which the use ratio the first polymeric matrix, the self-lubricative material, and the first fiber base of the first polymeric composite and the use ratio of the second polymeric matrix and the second fiber base of the second polymeric composite are adjusted within predetermined ranges, respectively such that the ratio of thermal expansion coefficient of the load support layer to the boss in the temperature range of −40 to 50 50° C. is about 1.5 to 3.1, the ratio of thermal expansion coefficient of the slide layer to the load support layer in the temperature range of 50 to 130° C. is 3.5 to 5.

The method may further include a step of cutting in the shape of a resultant bush after the step of forming the load support layer. Further, the method may further include a step of machining the inner circumferential surface of the slide layer and/or the outer circumferential surface of the load support layer of the resultant bush after the step of forming the load support layer.

First, a first polymeric composite including a first polymeric matrix, a self-lubricative material, and a first fiber base are formed (S100).

The step S100 may include: a step of forming a resin composition by adding a self-lubricative material to the first polymeric matrix; a step of weaving the first fiber base using a fiber; and a step of impregnating the woven first fiber base to the resin composition.

In this case, the use ratio of the first polymeric matrix, self-lubricative material, and first fiber base is adjusted within a predetermined range such that the ratio of the terminal expansion coefficient of the slide layer formed of the first polymeric composite to the thermal expansion coefficient of the load support layer in the temperature range of 50 to 130° C. is 3.5 to 5.

When the first fiber base is woven, it is appropriate to adjust the type of fiber and the thickness of the yarn in accordance with strength, a modulus of elasticity, a fatigue lifespan, and thickness of the resultant slide layer.

Regardless of whether it is performed before or after the step S100, the second polymeric composite including the second polymeric matrix and the second fiber base is formed (S200).

The step S200 may include: a step of weaving the second fiber base using a fiber; and a step of impregnating the woven second fiber base to the second polymeric matrix.

In this case, the use ratio of the second polymeric matrix and second fiber base is adjusted within a predetermined range such that the ratio of the terminal expansion coefficient of the load support layer formed of the second polymeric composite to the thermal expansion coefficient of the boss in the temperature range of −40 to 50° C. is about 1.5 to 3.1, and the 1/5 to 1/3.5 ratio to the thermal expansion coefficient of the slide layer in the temperature range of 50 to 130° C. is 3.5 to 5, respectively.

When the second fiber base is woven, similar to the weaving of the first fiber base, the type of fiber, the thickness of the yarn, and the like, are appropriately adjusted in accordance with thickness, strength, a modulus of elasticity, a fatigue lifespan, and the like, of the resultant load support layer.

Thereafter, the slide layer 101 is formed by winding the first polymeric composite formed in the step S100 on a mandrel (S300). In this case, the number of times and angle of winding the first polymeric composite on the mandrel are adjusted so that a slide layer having a desired thickness is formed.

Meanwhile, when the first polymeric matrix of the slide layer and the second polymeric matrix of the load support layer are not compatible with each other, a step of winding the first polymeric composite on a mandrel and then hardening the wound first polymeric composite may be further performed.

The hardening temperature and time are not specifically limited and may preferably be adjusted in consideration of the type of the initiator, the type of the first polymeric matrix, the type of the first fiber base, and the thickness and the number of times of winding the first polymeric composite. For example, when an aromatic polyamine-based initiator is used, it is possible to harden the first polymeric composite by heating it for about 10 to 30 minutes at a temperature of about 130 to 150° C. In this case, it is possible to minimize contraction and improve strength by performing post-hardening at the temperature condition after performing half-hardening for about one day at a room temperature.

Next, the load support layer is formed by winding the second polymeric composite formed in the step S200 around the slide layer formed in the step S300 (S400). In this case, the number of winding time of the second polymeric composite on the slide layer to form a desired load support layer is controlled to one time (one layer) or more. Further, the angle of the wound second polymeric composite is adjusted in consideration of desired strength of the load support layer.

Thereafter, the wound first polymeric composite and second polymeric composite are hardened (S500). Accordingly, a double-structure bush made of a polymeric composite including the slide layer 101 and the load support layer 102 integrally stacked on the outer circumferential surface of the slide layer is obtained.

The hardening temperature and time are not specifically limited, and similar to the first polymeric composite, it is preferable to adjust the hardening temperature and time in consideration of the type of the initiator, the types of the first and second polymeric matrixes, the types of the first and second fiber bases, and the thicknesses and the numbers of winding times of the first and second polymeric composites. For example, when an aromatic polyamine-based initiator is used, it is possible to harden the first and second polymeric composites by heating them for about 10 to 30 minutes at a temperature of about 130 to 150° C.

However, when a step of hardening the first polymeric composite has been separately performed, the hardening temperature and time for the second polymeric composite are adjusted such that the slide layer that has been hardened and performed is not deteriorated.

Meanwhile, the obtained bush may be cut to a desired length after the step S500.

Further, the pin unit 200 can smoothly rotate by machining the inner circumferential surface of the slide layer of the obtained bush with an appropriate tolerance after the step S500. Further, it is possible to prevent rotation in operation after press-fitting the bush inside the boss 300, by machining the outer circumferential surface of the load support layer of the bush with an appropriate tolerance.

Meanwhile, the present disclosure provides a bearing assembly (not illustrated) including the double-structure bush 200 described above. The bearing assembly may have a structure, for example, in which the pin unit 200 is inserted inside the inner circumferential surface of the double-structure bush 100.

Hereinafter, the present disclosure is described in more detail with reference to embodiments and comparative examples. However, the following embodiments are provided to exemplify the present disclosure and the scope of the present disclosure is not limited to the embodiments.

EXAMPLE 1

A first polymeric composite was obtained by impregnating woven fabric made of a polyester fiber to a resin composition including epoxy resin, graphite, and polytetrafluoroethylene particle) and then a slide layer having a thickness of 1 mm was formed by winding the first polymeric composite on a mandrel (diameter: 71 mm). The mixing ratio of the epoxy resin, polytetrafluoroethylene particle, graphite, and polyester fiber woven fabric in the first polymeric composite was adjusted to 20:20:30:30 by weight. Thereafter, a second polymeric composite was obtained by impregnating woven fabric made of a glass fiber to epoxy resin, a load support layer having a thickness of 6.5 mm was formed by winding the second polymeric composite on the slide layer formed on the surface of the mandrel, and then a double-structure bush (inner diameter: 71 mm, outer diameter: 86 mm, length: 60 mm) was obtained by thermally hardening it. In this case, the mixing ratio of the epoxy resin and the glass fiber woven fabric in the second polymeric composite was adjusted to 21:79 by weight.

EXAMPLE 2

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 20.4:20.4:30.6:28.6 by weight and the mixing ratio of the epoxy resin and the glass fiber woven fabric of the second polymeric composite was adjusted not to 21:79, but 20:80 by weight.

EXAMPLE 3

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 21.1:21.1:31.5:26.3 by weight and the mixing ratio of the epoxy resin and the glass fiber woven fabric of the second polymeric composite used in Example 1 was adjusted not to 21:79, but 20:80 by weight.

EXAMPLE 4

A double-structure bush was obtained in the same manner as Example 1, except that the mixing ratio of the epoxy resin and the glass fiber woven fabric, of the second polymeric composite used in Example 1 was adjusted not to 21:79, but 20:80 by weight.

EXAMPLE 5

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 20.4:20.4:30.6:28.6 by weight and the mixing ratio of the epoxy resin and the glass fiber woven fabric of the second polymeric composite used in Example 1 was adjusted not to 21:79, but 19:81 by weight.

EXAMPLE 6

A double-structure bush was obtained in the same manner as Example 1, except that the mixing ratio of the epoxy resin and the glass fiber woven fabric of the second polymeric composite used in Example 1 was adjusted not to 21:79 in Embodiment 1, but 19:81 by weight.

EXAMPLE 7

A double-structure bush was obtained in the same manner as Example 1, except that the mixing ratio of the epoxy resin and the glass fiber woven fabric of the second polymeric composite used in Example 1 was adjusted not to 21:79 in Embodiment 1, but 18:82 by weight.

Comparative Example 1

A bush made of structural carbon steel (SCM440) of which the surface has undergone salt bath nitriding and softly coated with $MoS_2$ was used as Comparative example 1.

Comparative Example 2

A Fe—Cu-based porous sintered bush was used as Comparative example 2.

Comparative Example 3

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 21.5:21.5:32.3:24.7 by weight and the mixing ratio of the epoxy resin and the glass fiber woven fabric of the second polymeric composite used in Example 1 was adjusted not to 21:79, but 20:80 by weight.

Comparative Example 4

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 20.4:20.4:30.6:28.6 by weight and the mixing ratio of the epoxy resin and the glass fiber woven fabric of the second polymeric composite used in Example 1 was adjusted not to 21:79, but 22:78 by weight.

Comparative Example 5

A double-structure bush was obtained in the same manner as Example 1, except that the mixing ratio of the epoxy resin, polytetrafluoroethylene particle, graphite, and polyester fiber woven fabric of the first polymeric composite used in Example 1 was adjusted not to 20:20:30:30, but 22.2:22.2:33.4:22.2 by weight and the mixing ratio of the epoxy resin and the glass fiber woven fabric of the second polymeric composite used in Example 1 was adjusted not to 21:79, but 22:78 by weight.

Experimental Example 1—Estimation of Properties

Thermal expansion coefficient and fitting amounts in the temperature range of −40 to 50° C. and the temperature range of 50 to 130° C., and press-fitting maintain limit surface pressure, compressive strength, and seizure cycles at −40° C. of the bushes manufactured respectively by Examples 1 to 7 and Comparative examples 1 to 5, and layer interface separation cycles of each bushes were measured.

1-1. Thermal Expansion Coefficient

Thermal properties of each bushes manufactured by Examples 1 to 7 and Comparative examples 1 to 5, and a housing with a boss were measured as follows with TMA equipment.

Displacement due to heat of the load support layers in the temperature range of −40 to 50° C. was measured by increasing temperature at 5° C./min, with minimum force (0.05 N) applied to the load support layers of the bushes such that the load support layers of the bushes can come in contact with a probe, and thermal expansion coefficients were calculated. In the same way, displacement of the slide layers of the bushes was measured in the temperature range of 50 to 130° C., displacement due to heat of a housing [QT-processed alloy tool steel (SKD11)] and the bushes of Comparative examples 1 and 2, and the thermal expansion coefficients were measured. In table 1, $T_1$ is the thermal expansion coefficient of the boss in the range of −40 to 50° C., $T_2$ is the thermal expansion coefficient of the load support layer in the range of −40 to 50° C., $T_3$ the thermal expansion coefficient of the load support layer in the range of 50 to 130° C., and $T_4$ is the thermal expansion coefficient of the slide layer in the range of 50 to 130° C.

1-2. Fitting Amount

Contraction of the inner diameter of the bushes was measured by comparing the inner diameter of the contracting bushes with the inner diameter of the bushes before press-fitting, after press-fitting the bushes into a boss of a housing. The amount of contraction of the inner diameter of the bushes is the fitting amount.

1-3. Press-Fitting Maintain Limit Surface Pressure

Surface pressure was measured when idling started due to fall of press-fitting force between the inner circumferential surface of the boss of a housing and the outer circumferential surface of the bushes when load was applied step by step under a non-lubricative atmosphere, a oscillation angle of 90°, a oscillation speed of 1 m/min, and temperature −40° C.

1-4. Seizure Cycle

The initial cycle where a friction coefficient was 0.35 or more was defined as a seizure cycle and measured through infinitely repeating tests under an infinite repeated load condition of non-lubricative atmosphere, a oscillation angle of 90°, a oscillation speed of 1 m/min, and load of 1 to 21 tons.

1-5. Compressive Strength

Compressive strength was measured through a test under KS M ISO 14126. In this case, applied load and deformation were measured by applying axial load to a rectangular specimen attached to a jig. Herein, the compressive strength is the maximum compressive stress that the specimen can resist and expressed in MPa.

1-6. Whether or not there is Layer Interface Separation

Whether abnormal surface pressure was generated was examined under an infinite repeated load condition of non-lubricative atmosphere, temperature of 25° C., a oscillation angle of 90°, a oscillation speed of 1 m/min, and load of 1 to 21 tons and the cycle when abnormal surface pressure was generated due to layer interface separation was defined as a layer interface separation cycle. In Table 1, "X" indicates that there was no interface separation until the test was stopped due to seizure and "◯" indicates that abnormal surface pressure was generated due to layer interface separation.

the load support layer at a high temperature of 50 to 130° C. was out of the range of 3.5 to 5, the press-fitting maintain limit surface pressure, seizure cycle, and layer interface separation cycle of the double-structure bush of examples 1 to 7 at −40° C. were high.

The invention claimed is:

1. A double-structure bush made of a polymeric composite, the double-structure bush constructed and arranged to be placed between a boss and a pin unit inserted thereinto, and the double-structure bush comprising:
 a slide layer configured to receive a pin unit, in which the inner circumferential surface of the slide layer is in contact with the pin unit to support rotation of the pin unit; and
 a load support layer integrally stacked on the outer circumferential surface of the slide layer, configured to be received in a boss, in which the load support layer is in contact with the inner circumferential surface of the boss to support radial load of the pin unit,
 wherein the slide layer is made of a first polymeric composite comprising (a) a first polymeric matrix, (b) a self-lubricative material, and (c) a first fiber base, and

TABLE 1

| Item | | Low-temperature (−40 to 50° C.) Thermal expansion coefficient ($10^{-6}$° C.) | | | High-temperature (50 to 130° C.) Thermal expansion coefficient ($10^{-6}$° C.) | | | Fitting amount (mm) | Press-fitting maintain limit surface pressure (MPa) (−40° C.) | Compressive strength (MPa) | Seizure cycle | Whether or not there is layer interface separation (layer interface separation cycle) |
|---|---|---|---|---|---|---|---|---|---|---|---|---|
| | | $T_2$ | $T_1$ | $T_2/T_1$ | $T_4$ | $T_3$ | $T_4/T_3$ | | | | | |
| example | 1 | 35.7 | 11.7 | 3.1 | 202.1 | 58.3 | 3.5 | 0.2 | 75 | 409 | 319,000 | X |
| | 2 | 26.2 | 11.7 | 2.2 | 235.3 | 51.1 | 4.6 | 0.2 | 82 | 415 | 289,000 | X |
| | 3 | 26.2 | 11.7 | 2.2 | 256.2 | 51.1 | 5.0 | 0.2 | 82 | 410 | 210,000 | ◯ (150,000) |
| | 4 | 26.2 | 11.7 | 2.2 | 202.1 | 51.1 | 4.0 | 0.2 | 82 | 415 | 321,000 | X |
| | 5 | 20.5 | 11.7 | 1.8 | 235.3 | 48 | 4.9 | 0.2 | 95 | 415 | 291,000 | X |
| | 6 | 20.5 | 11.7 | 1.8 | 202.1 | 48 | 4.2 | 0.2 | 90 | 420 | 320,000 | X |
| | 7 | 18 | 11.7 | 1.5 | 202.1 | 42 | 4.8 | 0.2 | 85 | 357 | 273,000 | X |
| Comparative example | 1 | 11.7 | 11.7 | 1 | — | — | — | 0.2 | 100 | — | 165,000 | — |
| | 2 | 17.5 | 11.7 | 1.5 | — | — | — | 0.2 | 95 | — | 250,000 | — |
| | 3 | 26.2 | 11.7 | 2.2 | 311.2 | 51.1 | 6.1 | 0.2 | 82 | 415 | 135,000 | ◯ (90,000) |
| | 4 | 48.3 | 11.7 | 4.1 | 235.3 | 61.2 | 3.8 | 0.4 | 65 | 408 | 118,000 | X |
| | 5 | 48.3 | 11.7 | 4.1 | 350.1 | 61.2 | 5.7 | 0.4 | 65 | 408 | 142,000 | ◯ (99,000) |

As can be seen from Table 1, in the double-structure bushes of Embodiments 1 to 7 in which the ratio $T_2/T_1$ of the thermal expansion coefficient $T_2$ of the load support layer to the thermal expansion coefficient $T_1$ of the boss at a low temperature of −40 to 50° C. was 1.5 to 3.1, the ratio $T_4/T_3$ of the thermal expansion coefficient $T_4$ of the slide layer to the thermal expansion coefficient $T_3$ of the load support layer at a high temperature of 50 to 130° C. was 3.5 to 5, the press-fitting maintain limit surface pressure at −40° C. was similar to that of the bush (metal bush of prior) of Comparative example 1 or the bush (porous sintered bush of prior) of Comparative example 2 and the seizure cycle was higher than that of the bush of the Comparative example 1.

Further, as compared with the double-structure bushes of Comparative examples 3 to 5, in which the ratio $T_2/T_1$ of the thermal expansion coefficient $T_2$ of the load support layer to the thermal expansion coefficient $T_1$ of the boss at a low temperature of −40 to 50° C. was out of the range of 1.5 to 3.1, the ratio $T_4/T_3$ of the thermal expansion coefficient $T_4$ of the slide layer to the thermal expansion coefficient $T_3$ of the mixing ratio of the first polymeric matrix, self-lubricative material, and first fiber base is 20 to 22:20 to 55:25 to 30 by weight, and
 the load support layer is made of a second polymeric composite comprising (a) a second polymeric matrix and (b) a second fiber base, and the mixing ratio of the second polymeric matrix and the second fiber base is 18 to 21:79 to 82 by weight.

2. The double-structure bush of claim 1, wherein the ratio $T_2/T_1$ of the thermal expansion coefficient $T_2$ of the load support layer to the thermal expansion coefficient $T_1$ of the boss in a temperature range of −40 to 50° C. is 1.8 to 2.2, and the ratio $T_4/T_3$ of the thermal expansion coefficient $T_4$ of the slide layer to the thermal expansion coefficient $T_3$ of the load support layer in a temperature range of 50 to 130° C. is 4.0 to 4.6.

3. The double-structure bush of claim 1, wherein the bush is used at surface pressure of 2 to 6 kgf/mm² and a sliding speed of 0.25 to 5 cm/sec.

4. A bearing assembly comprising the double-structure bush of claim 1.

5. The bearing assembly of claim 4, wherein the ratio $T_2/T_1$ of the thermal expansion coefficient $T_2$ of the load support layer to the thermal expansion coefficient $T_1$ of the boss in a temperature range of −40 to 50° C. is 1.8 to 2.2, and the ratio $T_4/T_3$ of the thermal expansion coefficient $T_4$ of the slide layer to the thermal expansion coefficient $T_3$ of the load support layer in a temperature range of 50 to 130° C. is 4.0 to 4.6.

6. The bearing assembly of claim 4, wherein the bush is used at surface pressure of 2 to 6 kgf/mm² and a sliding speed of 0.25 to 5 cm/sec.

* * * * *